United States Patent
Gaudillere

(10) Patent No.: US 9,797,421 B2
(45) Date of Patent: Oct. 24, 2017

(54) CLAMPING DEVICE FOR A WIRE ELEMENT

(71) Applicant: ZEDEL, Crolles (FR)

(72) Inventor: Antonin Gaudillere, Grenoble (FR)

(73) Assignee: ZEDEL, Crolles (FR)

( * ) Notice: Subject to any disclaimer, the term of this patent is extended or adjusted under 35 U.S.C. 154(b) by 340 days.

(21) Appl. No.: 14/715,123

(22) Filed: May 18, 2015

(65) Prior Publication Data

US 2015/0330425 A1    Nov. 19, 2015

(30) Foreign Application Priority Data

May 16, 2014 (FR) ...................... 14 01112

(51) Int. Cl.
| | |
|---|---|
| *F16B 2/06* | (2006.01) |
| *A42B 3/08* | (2006.01) |
| *F16G 11/10* | (2006.01) |
| *A44B 11/08* | (2006.01) |

(52) U.S. Cl.
CPC ............ *F16B 2/06* (2013.01); *A42B 3/085* (2013.01); *A44B 11/08* (2013.01); *F16G 11/106* (2013.01); *F16G 11/108* (2013.01); *Y10T 24/3984* (2015.01)

(58) Field of Classification Search
CPC ...... F16G 11/04; F16G 11/106; F16G 11/108; F16G 11/14; Y10T 24/39; Y10T 24/3927; Y10T 24/3969; Y10T 24/3984; Y10T 24/3996; Y10T 403/4345; Y10T 403/7066; Y10T 24/44615; Y10T 24/3976; F16B 2/02; F16B 2/06; A42B 3/085; A44B 11/08; B65D 63/14

See application file for complete search history.

(56) References Cited

U.S. PATENT DOCUMENTS

| | | | |
|---|---|---|---|
| 307,806 A | | 11/1884 | Sailer |
| 1,333,375 A | * | 3/1920 | Bauer .................. B65D 77/185 24/136 A |
| 3,007,220 A | * | 11/1961 | Hafner .................. B65D 63/14 403/18 |

(Continued)

FOREIGN PATENT DOCUMENTS

| | | |
|---|---|---|
| EP | 558427 A1 | 9/1993 |
| EP | 0629793 A1 | 12/1994 |

(Continued)

*Primary Examiner* — Jack W Lavinder
(74) *Attorney, Agent, or Firm* — Oliff PLC

(57) ABSTRACT

A clamping device has a body, at least one clamping member and an operating cover. The clamping member blocks at least one of the wire elements. The body has a cavity for passage a wire element and to house a clamping member, so that the clamping member is movable in the cavity along a first axis to a blocking position of the wire element. The operating cover is movable along the first axis relative to the body, and allows movement of the clamping member relative to the body along the first axis. The clamping device also has a drive device of the clamping member. The drive device enables free movement of the clamping member along the first axis with respect to the operating cover and with respect to the body, and enables movement of the clamping member away from the blocking position by actuation of the operating cover.

13 Claims, 5 Drawing Sheets

(56) References Cited

U.S. PATENT DOCUMENTS

| | | | | |
|---|---|---|---|---|
| 4,156,574 A | * | 5/1979 | Boden | F16G 11/101 24/115 M |
| 4,665,590 A | * | 5/1987 | Udelhofen | F16G 11/101 24/115 H |
| 4,807,333 A | * | 2/1989 | Boden | A43C 7/08 24/136 R |
| 5,373,588 A | | 12/1994 | Hede et al. | |
| 5,477,593 A | | 12/1995 | Leick | |
| 5,572,770 A | * | 11/1996 | Boden | F16G 11/106 24/136 R |
| 5,894,639 A | * | 4/1999 | Boden | F16G 11/101 24/115 G |
| 5,987,712 A | * | 11/1999 | Tucker | F16G 11/106 24/115 M |
| 2004/0250388 A1 | * | 12/2004 | Martin | A43C 7/00 24/712.5 |
| 2009/0320186 A1 | | 12/2009 | Petzl et al. | |
| 2012/0005865 A1 | * | 1/2012 | Boden | F16G 11/101 24/136 R |

FOREIGN PATENT DOCUMENTS

| | | |
|---|---|---|
| EP | 2138061 A1 | 12/2009 |
| WO | 2013/191544 A1 | 12/2013 |

* cited by examiner

CLAMPING DEVICE FOR A WIRE ELEMENT

BACKGROUND OF THE INVENTION

The invention relates to a clamping device for a wire element such as a strap, a rope, a cord, a lace, etc.

STATE OF THE ART

In the field of sport, and in particular that of mountain sports, it is important to be able to securely block one or more wire elements such as ropes, cords or straps in dependable and efficient manner.

This is for example very important for protection helmets in rock-climbing and mountaineering. Adjustment of the position of the neckband and of the neckband straps with respect to the headband has to be correctly performed for the helmet to be fully effective in the event of an impact.

The protection helmet described in the document EP 558427 filed in the name of the applicant relates to a helmet, adjustment of which is performed by means of two internal knobs, which engage by meshing with notches of racks provided in the headband and in the neckband. The knobs protrude out partially under the lateral edge on each side of the crown. One of the knobs serves the purpose of performing adjustment of the headband and the other of the knobs enables adjustment of the neckband.

In Patent application EP 2138061 also in the name of the applicant, the protection helmet comprises a neckband that is adjustable by means of two movable slides through a slit of the crown. These two slides engage by meshing with two racks securely attached to the neckband.

In these two examples of the prior art, the adjustment is precise and efficient but has to be performed by the user and requires learning. The drawback is that when use in a collective organisation is involved, it is difficult for the instructor to perform adjustment of the helmets in the place of the user.

In the field of tightening of shoe laces, Patent application EP 0629793 A1 discloses a device for clamping laces comprising a body, a clamping member and an operating cover provided with two flexible tabs. The clamping member is positioned in a cavity of the body and the operating cover is positioned above the body. The clamping member and operating cover are securely attached to one another so that movement of the operating cover results in movement of the clamping member. In the absence of an external force, the flexible tabs push the operating cover and therefore the clamping member to a position such that the laces are held tight between the wall of the body and the clamping member. To tighten the laces, the user has to pull the laces tight and make the clamping device translate by pushing on the body. In opposite manner, to loosen the laces, the user has to pull on the operating cover in order to move the clamping member away from the blocking position.

Use of this device is relatively intuitive for tightening of shoe laces as the user can see what he/she is doing. Use of this device to adjust a neckband of a protection helmet does on the other hand prove complex as the user has to make the adjustments without seeing what he/she is doing.

A requirement therefore exists to provide helmets with clamping devices that are intuitive and simple to use, in particular in the scope of use in collective organisations where the users are not familiar with this type of equipment.

OBJECT OF THE INVENTION

One object of the invention consists in providing a device of at least one wire element which is dependable and easy to adjust.

For this purpose, the clamping device comprises
- at least one clamping member designed to block at least one of the wire elements by clamping,
- a body provided with a cavity to allow the passage of at least one of the wire elements and to house at least one of the clamping members so that at least one of the clamping members is movable in translation in the cavity along a first axis to a blocking position of at least one of the wire elements,
- an operating cover, movable in translation along the first axis with respect to the body and configured to allow movement of the clamping member relatively to the body along the first axis,
- drive means for moving the clamping member by means of the operating cover.

The drive means on the one hand enable free movement of the clamping member along the first axis with respect to the operating cover and with respect to the body, and on the other hand enable movement of the clamping member so that the latter leaves the blocking position by actuation of the operating cover.

The operating cover can comprise stop elements limiting the movement of the body with respect to the operating cover and allowing a movement clearance between the body and the operating cover. The drive means can enable free movement of the clamping member along the first axis with respect to the operating cover and with respect to the body when the operating cover is up against the stop formed by the body.

According to one feature of the invention, the drive means are configured to move in a hole arranged in a wall of the body. The hole can be pass-through and the drive means can be configured to move in a hole in a wall of the operating cover.

According to an alternative embodiment, flexible means can be positioned between the wall of the body and at least one of the clamping members, the flexible means being configured to move at least one of the clamping members to the blocking position.

According to one embodiment of the device, the operating cover comprises a cavity configured to house the body and to enable the passage of at least one of the wire elements.

According to one feature of the invention, at least one of the clamping members comprises at least one prism configured to block at least one of the wire elements against a wall of the body.

According to another feature of the invention, at least one of the clamping members comprises a wheel movable in rotation around a second axis orthogonal to the first axis, the wheel being configured to block at least one of the wire elements against a wall of the body.

The invention can relate to a protection helmet comprising a clamping device provided with the above-mentioned features, the clamping device being able to be designed to tighten or loosen neckband straps of the protection helmet.

The invention can also be used on lace-up shoes comprising a clamping device provided with the above-mentioned features, the clamping device being able to be designed to tighten or loosen laces.

The invention can also relate to a backpack comprising a clamping device provided with the above-mentioned features, the clamping device being able to be designed to tighten or loosen a closing cord of the backpack.

The invention finally relates to a method for clamping at least one of the wire elements by means of a clamping device provided with the above-mentioned features, the method comprising the following steps:
  applying a tension on at least one of the wire elements with respect to the operating cover so as to move at least one of the clamping members to a released position,
  stopping said tension on at least one of the wire elements.

The method for releasing at least one wire element for its part comprises the following step:
  making the operating cover translate with respect to the body until it engages movement of at least one of the clamping members to a released position of at least one of the wire elements.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
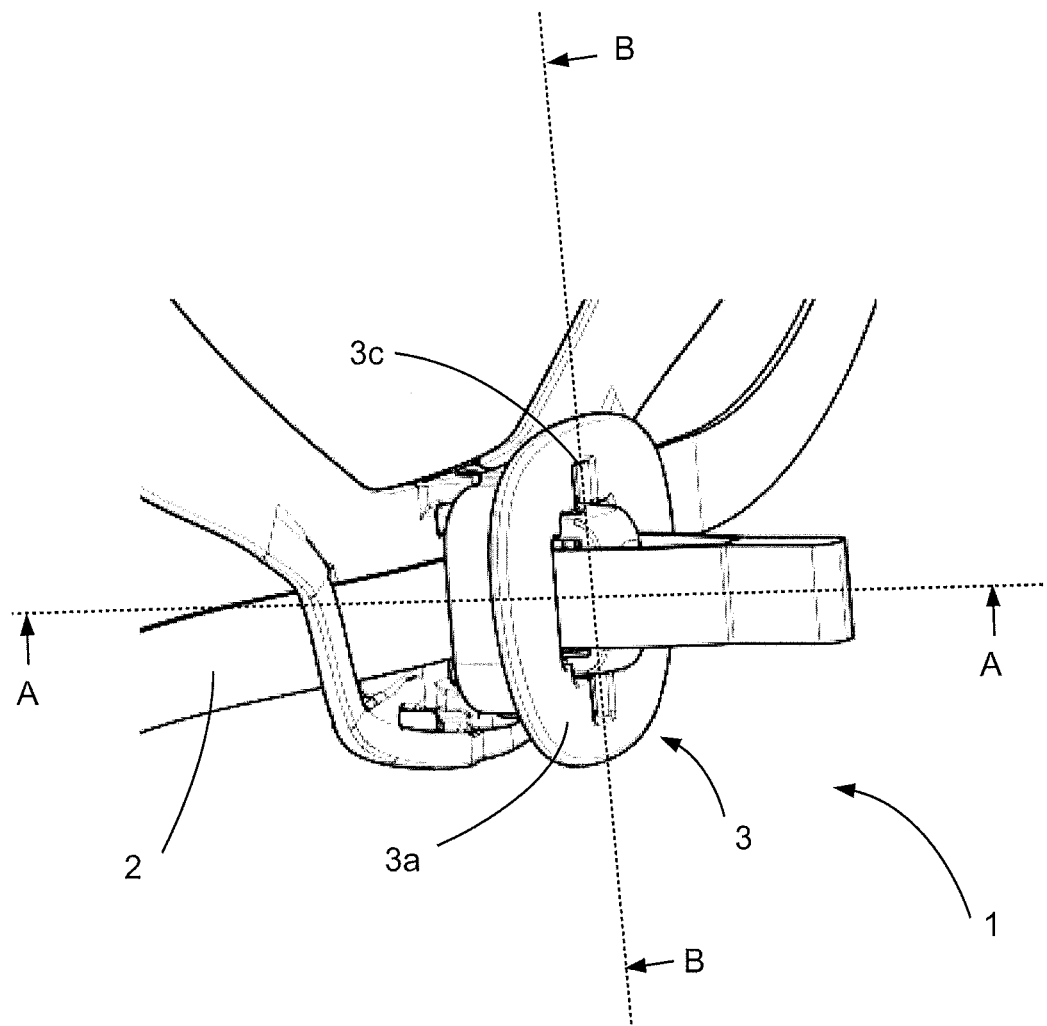
FIG. 1 illustrates a perspective view of an embodiment of a clamping device, in schematic manner.

The invention relates to a clamping device 1 of at least one wire element 2. According to the embodiment illustrated in the figures, the clamping device 1 is configured to enable clamping and releasing of straps, in particular neckband straps of a rock-climbing helmet.

To clamp the wire element or elements 2, the clamping device 1 is provided with at least one clamping member 7 housed in a cavity 4d of a body 4. The cavity 4d of the body is also configured to allow the passage of at least one of the wire elements 2.

More precisely, the body 4 has at least one inlet hole 4a and at least one outlet hole 4b enabling passage of the wire element or elements 2 in at least one movement channel (not shown). The movement channel passes through the body 4. For example, in the embodiment represented in FIGS. 2 and 3, the body 4 has two inlets 4a through each of which a strap passes, an outlet 4b, and a substantially frustum-shaped cavity 4d the base of which is situated on the same side as the inlets 4a.

Inside the cavity 4d, at least one of the clamping members 7 is movable along a first axis AA (see FIG. 1), and advantageously until it reaches a blocking position of the wire element or elements 2 against the wall of the body 4. Translation of the clamping member 7 in a first direction along the axis AA therefore results in clamping of at least one of the wire elements 2, whereas they are freed by translation of the clamping member 7 in a second direction opposite to the first direction. The clamping member 7, cover 4 and operating cover 3 are securely attached to one another.

For the clamping device 1 to be able to be operated, the latter advantageously comprises an operating cover 3. The operating cover 3 is movable in translation with respect to the body 4 along the axis AA and is configured to allow movement of the clamping member 7 with respect to the body 4. The clamping member 7 can move with respect to the operating cover 3 and with respect to the body 4 at the same time. Movement of the operating cover therefore does not necessarily result in movement of the clamping member 7.

The clamping device 1 advantageously comprises drive means 5 of the clamping member 7 by means of the operating cover 3. The drive means 5 are configured so as to allow free movement of the clamping member with respect to the body 4 without coupling between the operating cover 3 and the clamping member 7. In this first configuration, the clamping member 7 is free to move along the axis AA with respect to the operating cover 3 and with respect to the body 4 when the operating cover 3 is up against the stop formed by the body 4. Movement of the clamping member 7 can be achieved for example by actuating the wire elements 2.

The drive means 5 are also configured so as to move the clamping member 7 away from the blocking position by actuation of the operating cover 3. Under these conditions, if the clamping member 7 is in its blocking position, the operating cover 3 simply has to be moved to leave the blocking position and to reduce the stress applied on the wire element 2.

In other words, the operating cover 3 comprises stop elements limiting the movement of the body 4 relatively to the cover, these stop elements allowing a movement clearance between the body 4 and the operating cover 3. The drive means 5 can move freely along the axis AA between these stop elements so as to enable movement along the axis AA of at least one of the clamping members 7 with respect to the operating cover 3. The movement clearance is configured to allow movement of the operating cover 3 up to one of the stop elements so as to cause translation of at least one of the clamping members 7 so that the latter leaves the blocking position.

The drive means 5 can be formed by any suitable means enabling a relative movement of the different parts with respect to one another. In advantageous manner, the drive means 5 comprise at least one connector which is fixed onto one of the elements secured to one another (i.e. operating cover 3, body 4 and clamping member 7) and which move inside a cavity arranged in the other two elements.

As an example, as illustrated, it is possible to have a connector fixed to a clamping member 7 and which moves in cavities 3b and 4d respectively arranged in the operating cover 3 and in the body 4.

In an alternative embodiment, it is possible to have a connector fixed to the operating cover 3 and which moves in cavities arranged in the body 4 and in the clamping member 7.

As a variant, it is further possible to have a first connector fixed to the operating cover 3 and which moves in a cavity arranged in the body 4. The body 4 has a second connector which moves in a cavity arranged in the clamping member 7. A connector also exists which under certain conditions connects the operating cover 3 and the clamping member 7.

An opposite configuration can be achieved with a first connector fixed to the body 4 and collaborating with the operating cover 3, a second connector fixed to the clamping member 7 and collaborating with the body 4 and a last connector which is fixed to the operating cover 3 or to the clamping member 7.

These different embodiments can be combined for example to form connectors fixed to the operating cover 3 and to the clamping member 7.

These connectors move in different cavities formed in the body 4 or in one and the same cavity. If the two cavities are different, an additional connector linking the movement of the operating cover 3 with respect to the clamping member 7 is used.

Figure 4:
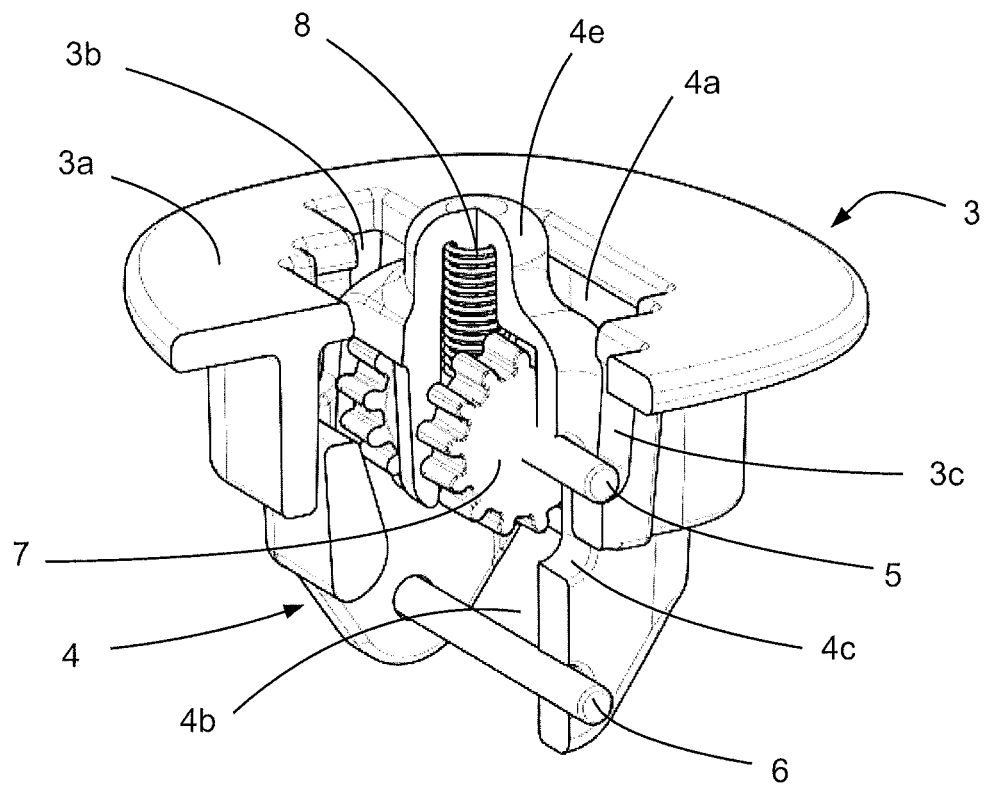
FIGS. 4 and 5 are truncated perspective views illustrating the two possible positions represented in FIGS. 2 and 3, FIGS. 6a and 6b illustrate use of the device on a protection helmet.
Figure 5:
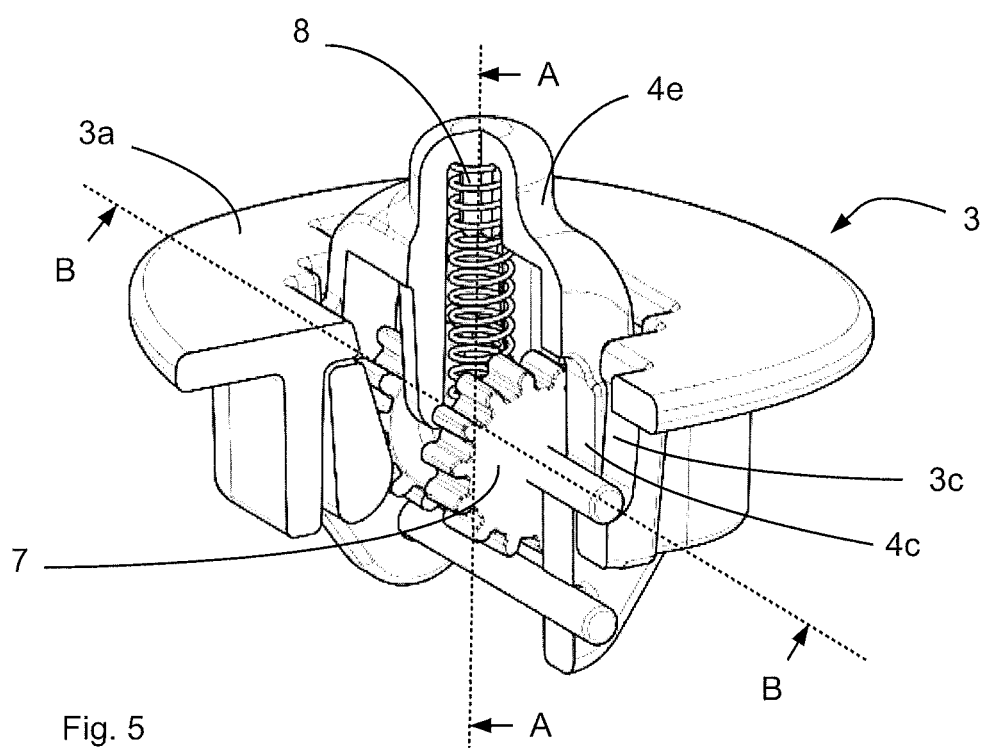
Figure 6A:
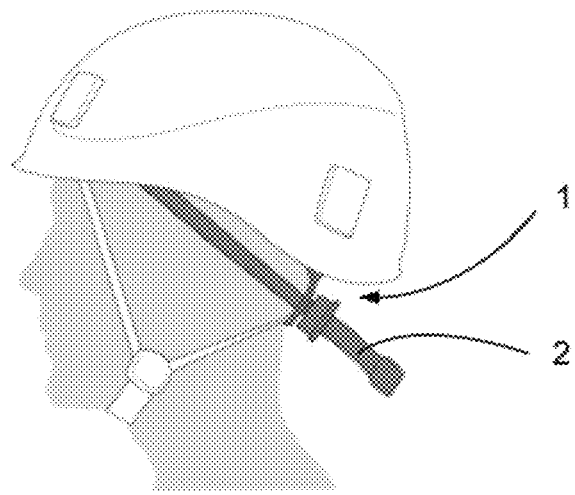
Figure 6B:
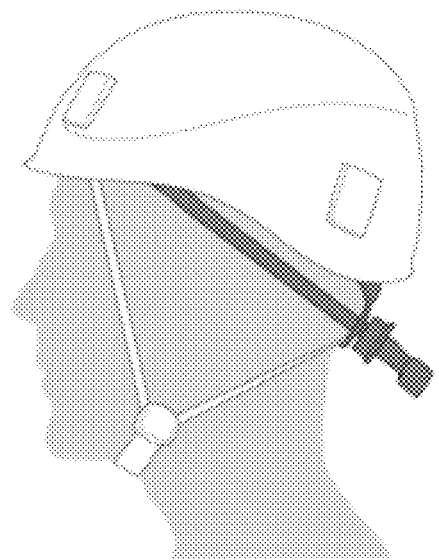

As will be seen further on, the clearance can be defined by means of an oblong hole 3c positioned on the walls of the operating cover 3 (cf. FIGS. 4 and 5). The clearance can also be defined by means of a hole in the clamping member 7. It is further possible to provide for the clearance to be defined by a difference of position between two connectors.

In the embodiment illustrated in FIGS. 4 and 5, the connector is formed by a rod 5 which moves in the oblong hole 3c. The rod 5 also moves in the hole 4c arranged in the body 4. It can be observed that in a first configuration the rod 5 moves in the hole 4c without coming up against the stop formed by the oblong hole 3c. It is therefore possible to have a movement of the clamping member 7 inside the body 4 and with respect to the operating cover 3.

When the operating cover 3 is actuated, the oblong hole 3c moves until it comes into contact with the rod 5. By continuing the movement of the operating cover 3, the clamping member 7 is moved away from the blocking position.

These drive means 5 are configured for driving of the clamping member 7 with the operating cover 3 to take place when the operating cover 3 moves beyond a threshold position with respect to the body 4 preferentially in a releasing direction. In this way, when the operating cover 3 is in a particular area, the clamping member 7 can move independently from the operating cover 3. The clamping member 7 is for example in a blocking position of the wire element or elements 2, except if the wire element or elements 2 tend to move it away from the blocking position.

When the threshold position is reached, there is a mechanical connection between the clamping member 7 and the operating cover 3 so that the operating cover 3 can cause movement of the clamping member 7 with respect to the body 4 to leave the blocking position of the wire element 2.

If the clamping member 7 is not in the blocking position, mechanical coupling between the clamping member 7 and the operating cover 3 is obtained beyond the threshold position.

Thus, under certain conditions, there may be a mechanical connection between the operating cover 3 and the clamping member 7 so that movement of the operating cover 3 results in movement of the clamping member 7. Under other conditions, the clamping member 7 can move freely with respect to the operating cover 3—there is no direct mechanical connection between these two elements. In this configuration, movement of the operating cover 3 with respect to the body 4 enables the stress on the wire element 2 to be simply released.

The use of drive means 5 comprising a movement clearance or allowing free movement of the clamping member 7 with respect to the operating cover 3 is particularly advantageous when the clamping device 1 is configured in such a way that the user performs gripping of the clamping device 1 by the operating cover 3. In devices of the prior art, the operating cover 3 is in fact exclusively used for performing releasing and the body 4 is exclusively used for clamping of the wire element 2. Actuation of the operating cover 3 when the clamping phase is performed makes movement of the wire element 2 very difficult.

To force the clamping member or members 7 to place themselves in the blocking position, it can be envisaged to add flexible means 8 between the wall of the body 4 and the clamping member or members 7. The flexible means 8 are then in the rest position when the clamping member or members 7 are in the blocking position, and they are stressed when the clamping member or members 7 are not in the blocking position. The flexible means 8 can be formed by any suitable device, for example a spring, a blade acting in flexion, a tube deforming to revert to its initial shape.

When the wire element or elements 2 are straps, it may be advantageous to add flexible means 8 in the clamping device. Straps do in fact have the property of not deforming when a traction force is applied and can contribute to the movement of the clamping member 7 away from the blocking position.

In opposite manner, when the clamping device 1 is used to tighten laces, the flexible means are not necessarily useful. Laces do in fact generally have a smaller cross-section when they are pulled tight than when they are at rest. Consequently, the increase of the cross-section of the laces when they are no longer pulled tight is sufficient to cause clamping by the clamping member 7.

In general manner, the flexible means 8 are not necessary if actuation of the wire element 2 in the direction of the blocking position is sufficient to cause movement of the clamping member 7 towards the blocking position.

FIGS. 1 to 5 represent a detailed view of an embodiment of a clamping device able to be fitted on a neckband of a protection helmet.

To be fixed onto a neckband, the clamping device comprises fixing means 6. In this configuration, the body 4 is fixed to the neckband, which facilitates the application of forces on the different elements of the clamping device 1.

The fixing means 6 can comprise a rod which passes through one or more holes arranged in the body 4. The rod or another element can be placed at the level of the outlet 4b of the body 4 in order to facilitate positioning of the wire element in the body 4. Here, each strap passes right through the rod.

The fixing means 6 enable movement of the clamping device 1 to be limited with respect to the object on which it is fixed, here a helmet. Fixing of the clamping device 1 on the object to be adjusted is performed by means of the body 4. In this configuration, the force is applied on the wire element 2 pressing on the helmet.

In a particular embodiment, the fixing means can be used to prevent the operating cover 3 from coming loose from the body 4. The rod 6 can be configured to form a stop when the end of travel is reached. As a variant, the end-of-travel stop can be formed by the part to be adjusted.

In the embodiment illustrated in the figures, the operating cover 3 is advantageously provided with a cavity 3b the shape of which is suitable for housing the body 4 and for enabling the passage of at least one of the wire elements 2 both through the body 4 and through the operating cover 3. The operating cover 3 is more particularly structured to allow the passage of two straps, one on each side of the body 4. To facilitate gripping of the operating cover 3 by the user, the cover can advantageously be provided with a salient portion 3a.

A coil spring 8 enables application of biasing force from the body 4 on the clamping member 7 in order to place it in the blocking position of the wire element 2. In the illustrated embodiment, the coil spring is arranged between the top wall of the body 4 and the clamping member 7, and more precisely inside a guide rail 4e arranged in the body 4.

The clamping member 7 can for example be a prism with a triangular or trapezoid base (not shown), the large base of which is positioned on the same side as the inlets 4a of the wire elements. Blocking of the wire elements 2 is performed by frictions between the walls of the cavity 4d and the lateral sides of the prism.

According to an alternative embodiment illustrated in the figures, the clamping member 7 can be a wheel free in rotation along the longitudinal axis of the rod 5. Using a wheel as clamping member 7 enables several wire elements 2 to be blocked simultaneously, even if the traction force is different on each wire element 2. The wheel may be provided with teeth to increase the friction forces which cause clamping of the wire element or elements 2.

The clamping member 7 can also comprise several blocking parts, for example several wheels or several prisms, and it is also possible to combine these two embodiments.

Here, the clamping member 7 has a pass-through hole (not shown) of axis BB orthogonal to the axis AA through which a rod 5 is inserted. The rod 5 collaborates with the holes 4c arranged in the body 4, and the holes 3c arranged in the operating cover 3 to allow movement of the clamping member 7 relatively to these two parts. The holes 3c and 4c act as a guide rail for the rod 5. The holes 4c are advantageously pass-through, whereas the holes 3c can be pass-through or not.

It is particularly advantageous to use a rod 5 passing through the pass-through cavities in the body 4 and in the operating cover 3 as manufacture and repair of the clamping device 7 are thereby facilitated.

In this configuration, movement of the operating cover 3 with respect to the body 4 can be performed without movement of the clamping member 7 up to a certain point. When the operating cover 3 is moved with respect to the body beyond a threshold position, the rod 5 comes up against the stop formed by the hole 3c so that the operating cover 3 comes into mechanical contact with the clamping member 7. From this moment on, the clamping member is driven by the operating cover 3 which results in movement of the clamping member 7. However, if the clamping member 7 is already in the released position, there is not necessarily any contact with the operating cover 3.

The holes 3c and 4c are advantageously formed in the operating cover 3 and in the body 4 so that the movement travel of the clamping member 7 is formed by the edges of the holes. In a preferential embodiment, the hole 4c defines the two stops which define the extreme relative positions between the body 4 and the clamping member 7, and the hole 3c defines the two stops which define the extreme relative positions between the clamping member 7 and the operating cover 3.

In advantageous manner, to limit the lateral movement of the clamping member 7 in the cavity 4d of the body, the rod 5 advantageously translates in the guide rail 4e of the body 4. This guide rail 4e is preferably arranged in the centre of the body 4 so as to limit deformation of the clamping member if large forces are applied for example when tightening is performed. The lateral movement is limited along an axis perpendicular to the axis AA and to the axis BB. Preferentially, the guide rail 4e forms a housing area of the flexible means 8.

It is observed that it is particularly advantageous to dimension the cavities 3b of the operating cover 4d and of the body 4 to ensure securing of the parts to one another and/or to perform driving of the clamping member 7 with the operating cover 3. In this way, the device is particularly compact and robust as the number of parts used is reduced.

As a variant, the drive means of the clamping member 7 with the operating cover 3 can be formed by other elements and in particular by a salient part for example a rod 5 which moves inside the body 4. This embodiment is particularly advantageous if the cavities 4c are not pass-through.

For example, a rod securely attached to the operating cover 3 and salient inside the cavity 4a of the body 4 can be used. When movement of the operating cover 3 takes place, the rod moves until it comes into contact with the clamping member 7 and causes movement of the latter. These means can for example be configured to be inserted via the outlet hole 4b in the cavity 4d of the body 4 and to push the rod 5 in the releasing direction when the user moves the operating cover 3 in this same direction.

This embodiment is less advantageous than the previous embodiments as it requires a rod to be used which passes through the body 4 and through the operating cover 3 to actuate the clamping member 7.

To use the clamping device 1 in order to clamp one or more wire elements 2, the user has in a first instance to apply a tension on the wire element or elements 2 with respect to the body 4 so as to move the wire element or elements 2 with respect to the clamping device 1 to a released position.

Figure 2:
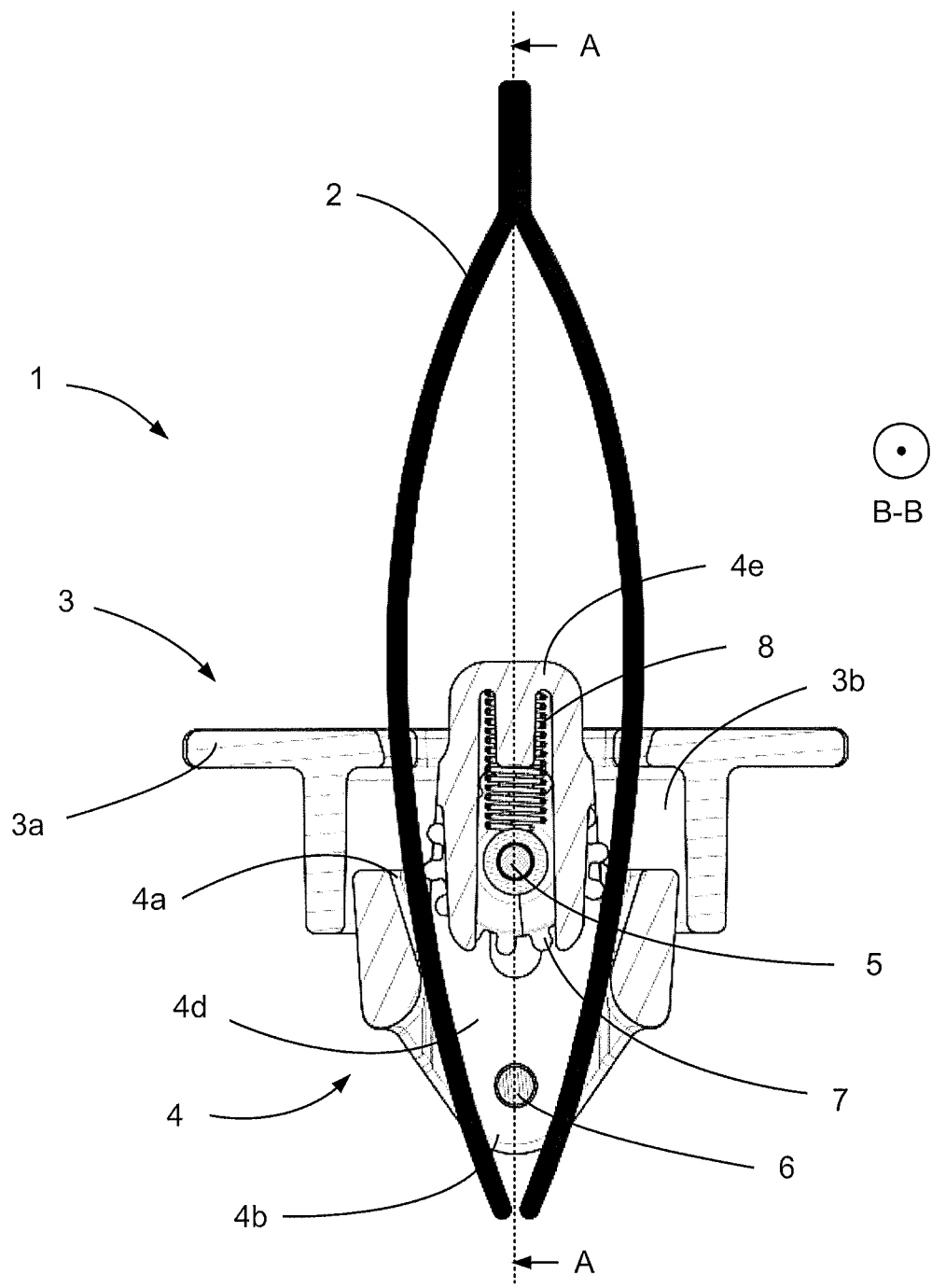
FIGS. 2 and 3 are cross-sectional views representing two possible positions of the clamping device according to a first embodiment.
Figure 3:
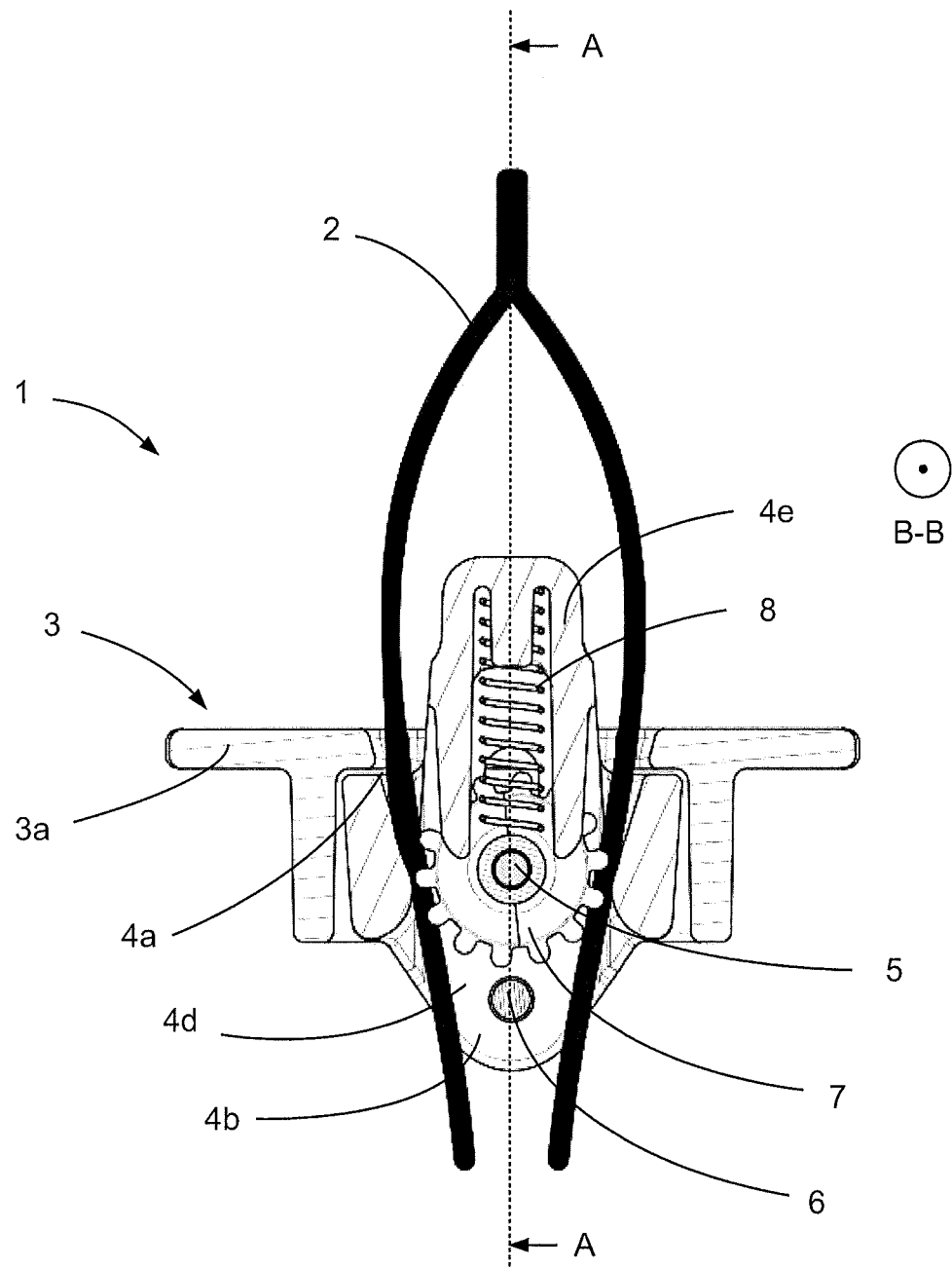

The force applied on the wire element or elements 2 enables the clamping member 7 to be moved in the direction A1 (FIG. 2). The clamping member 7 moves to the released position and it can be up against the stop formed by the body 4 and/or the operating cover 3. In advantageous manner, the clamping member 7 is up against the stop formed by the body 4 so as to take advantage of a maximum amplitude for passage of the wire element or elements 2. The force applied on the wire element or elements 2 counteracts the force applied by the flexible means 8, and the wire element or elements 2 can move between the clamping member 7 and the wall of the body 4.

In an advantageous embodiment, the tensile force is applied on the wire element or elements 2 with respect to the operating cover 3 which presses against the body 4. This embodiment is particularly advantageous when the wire element or elements 2 make access to the body 4 difficult, for example when at least two straps are used and pass right through the clamping member 7.

As soon as the force disappears or decreases below a threshold value, the clamping member 7 is placed in the blocking or clamping position. The wire element or elements 2 are then jammed between the wall of the body 4 and the clamping member 7.

Pulling on the wire element or elements 2 with respect to the body 4, and preferentially with respect to the operating cover 3, enables the rod 5 to translate in the direction AA, and enables the clamping member 7 to move away from the blocking position and with respect to the wire elements 2.

When the tensile force decreases, for example when the user releases the operating cover 3 and/or wire elements 2, the friction forces between the walls of the cavity 4d and clamping member 7 cause blocking of the wire element or elements 2. The latter are blocked in the position desired by the user.

To perform releasing of the wire element or elements 2, actuation of the operating cover 3 causes movement of the clamping member 7 from the blocking position to the released position. Actuation of the operating cover 3 results in a movement of the operating cover 3 with respect to the body 4. In a first part, the cover 3 is moved without causing actuation of the clamping member 7. Then the cover 3 couples with the clamping member 7 which leaves the blocking position.

In this case, if no force is applied on the wire element or elements 2, the latter move to reduce the clamping force which they support. It is also possible to apply a force on the wire element or elements 2 in the opposite direction to that of clamping.

On releasing the operating cover 3, the clamping device 7 is immobilised in the position chosen by the user.

The clamping device 1 can judiciously be used on sports goods, for example on a protection helmet in order to adjust the neckband straps as illustrated in the figures. In this configuration, when the helmet is placed on the user's head, he/she simply has to pull on the wire elements 2 to achieve tightening of the helmet. In the same way, actuation of the operating cover 3 enables the helmet to be easily loosened. The helmet can thus be adjusted to the user's head size, thereby guaranteeing optimal use of the helmet.

The clamping device 1 can also be used on lace-up shoes in order to tighten and jam the laces. The device prevents any nuisance loosening of the laces that would be a source of discomfort for the user.

Backpacks can also be provided with a clamping device 1, for example to tighten the cord of a sealing skirt in order to protect the contents of the backpack.

Without departing from the scope of the invention, the person skilled in the art can very easily combine the different technical features, which have been described in the foregoing. The clamping device may for example not be placed on any fixed part, as in the case of use for tightening shoe laces.

The invention claimed is:

1. A clamping device of at least one wire element, comprising:
   at least one clamping member designed to block at least one of the wire elements by clamping,
   a body provided with a cavity to allow the passage of at least one of the wire elements and to house at least one of the clamping members so that at least one of the clamping members is movable in translation in the cavity along a first axis to a blocking position of at least one of the wire elements,
   an operating cover, movable in translation along the first axis with respect to the body and configured to allow movement of the clamping member relatively to the body along the first axis,
   drive means for moving the clamping member by means of the operating cover,
   wherein the drive means on the one hand enable free movement of the clamping member along the first axis with respect to the operating cover and with respect to the body, and on the other hand enable movement of the clamping member so that the latter leaves the blocking position by actuation of the operating cover.

2. The clamping device according to claim 1, wherein the operating cover comprises stop elements limiting the movement of the body with respect to the operating cover and allowing a movement clearance between the body and the operating cover, the drive means enabling free movement of the clamping member both along the first axis with respect to the operating cover and with respect to the body when the operating cover is up against the stop formed by the body.

3. The clamping device according to claim 1, wherein the drive means are configured to move in a hole arranged in a wall of the body.

4. The clamping device according to claim 3, wherein the hole is pass-through and the drive means are configured to move in a hole in a wall of the operating cover.

5. The clamping device according to claim 1, comprising flexible means positioned between the wall of the body and at least one of the clamping members, the flexible means being configured to move at least one of the clamping members to the blocking position.

6. The clamping device according to claim 1, wherein the operating cover comprises a cavity configured to house the body and to enable the passage of at least one of the wire elements.

7. The clamping device according to claim 1, wherein at least one of the clamping members is a prism configured to block at least one of the wire elements against a wall of the body.

8. The clamping device according to claim 1, wherein at least one of the clamping members is a wheel movable in rotation around a second axis orthogonal to the first axis, the wheel being configured to block at least one of the wire elements against a wall of the body.

9. A protection helmet comprising a clamping device according to claim 1, the clamping device being designed to tighten or loosen neckband straps of the protection helmet.

10. Lace-up shoes comprising a clamping device according to claim 1, the clamping device being designed to tighten or loosen laces.

11. A backpack comprising a clamping device according to claim 1, the clamping device being designed to tighten or loosen a closing cord of the backpack.

12. A method for clamping at least one wire element by means of a clamping device according to claim 1, the method comprising the following steps:
    applying a tension on at least one of the wire elements with respect to the operating cover so as to move at least one of the clamping members to a released position,
    stopping said tension on at least one of the wire elements.

13. A method for releasing at least one wire element by means of a clamping device according to claim 1, the method comprising the following step:
    making the operating cover translate with respect to the body until it engages movement of at least one of the clamping members to a released position of at least one of the wire elements.

* * * * *